United States Patent [19]
Hill et al.

[11] Patent Number: 5,893,565
[45] Date of Patent: *Apr. 13, 1999

[54] ANTI-LEAKAGE DEVICE

[75] Inventors: Jason J. Hill, Manchester; Joseph L. Tevaarwerk, Clayton, both of Mo.

[73] Assignee: Emerson Electric Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/764,161

[22] Filed: Dec. 13, 1996

Related U.S. Application Data

[63] Continuation of application No. 08/429,310, Apr. 26, 1995, abandoned.

[51] Int. Cl.⁶ .................................................. F16J 15/32
[52] U.S. Cl. .................................... 277/430; 277/423
[58] Field of Search .................................. 277/9, 9.5, 11, 277/214, 215, 37, 134, 203, 53, 354, 418, 430, 423

[56] References Cited

U.S. PATENT DOCUMENTS

| | | | |
|---|---|---|---|
| 924,897 | 6/1909 | Emmet | 277/134 |
| 1,072,421 | 9/1913 | Brown | 277/134 |
| 1,493,598 | 5/1924 | Buckwalter | 277/53 |
| 2,606,779 | 8/1952 | Jagger | 277/134 |
| 3,131,942 | 5/1964 | Ertaud | 277/53 |
| 3,843,140 | 10/1974 | Mayer et al. | 277/67 |
| 3,912,284 | 10/1975 | Gosling et al. | 277/53 |
| 3,915,519 | 10/1975 | Lautner et al. | |
| 3,975,026 | 8/1976 | Boyle et al. | 277/134 |
| 4,144,950 | 3/1979 | Moyer et al. | |
| 4,471,963 | 9/1984 | Airhart | 277/134 |
| 5,291,089 | 3/1994 | Snider et al. | |
| 5,462,420 | 10/1995 | Stehr et al. | 277/134 |

FOREIGN PATENT DOCUMENTS

| | | | |
|---|---|---|---|
| 591739 | 1/1934 | Germany | 277/134 |
| 0744818 | 2/1956 | United Kingdom | 277/53 |

*Primary Examiner*—Daniel G. DePumpo
*Attorney, Agent, or Firm*—Howell & Haferkamp, L.C.

[57] ABSTRACT

In a machine in which a rotating shaft extends into a housing through a gland, the shaft being rotated in only one direction, the housing containing lubricant, the gland including an opening of substantial length with an annular radially inwardly extending flange at an axially inner end, an anti-leakage device comprises a sleeve mounted on and around the shaft closely but to permit rotation of the shaft, and mounted against rotation in the gland opening. The sleeve has an annular seat, in which an O-ring is mounted, and a helical groove in a surface contiguous the shaft, the groove being formed in a direction with respect to the direction of rotation of the shaft to move fluid in a direction toward the housing. The clearances between the shaft and housing when the shaft is not rotating are such as to prevent the lubricant in the housing from leaking out.

20 Claims, 4 Drawing Sheets

5,893,565

1

ANTI-LEAKAGE DEVICE

This is a continuation of application Ser. No. 08/429,310 filed on Apr. 26, 1995 now abandoned.

BACKGROUND OF THE INVENTION

The anti-leakage device of this invention is described as applied to a gear box, but its utility is not limited thereto. The gear box of the illustrative embodiment can be of the general type described in co-pending application Ser. No. 08/303, 365, filed Sep. 9, 1994. As illustrated in that application, the seals used in machinery of this sort have generally depended upon the squeezing of a flexible lip seal against the rotating shaft. Because the resilient lip seals have necessarily to bear snugly against the shaft, their life is limited because of the attrition of the seal by the action of the shaft. Typically, run time before failure is on the order of 5,000 hours. Furthermore, the use of a lip seal requires special treatment of the shaft to resist wear or scoring of the shaft and wear of the seal in operation, and special precautions in shaft-to-housing assembly to avoid damage to the seal.

One of the objects of this invention is to provide a seal or anti-leakage device that does not rely upon interference to prevent leakage, and therefore is not subject to appreciable wear.

Another object is to provide such an anti-leakage device that is inexpensive, and easy to assemble as compared with a lip seal.

Other objects will become apparent to those skilled in the art in the light of the following description and accompanying drawing.

SUMMARY OF THE INVENTION

In accordance with this invention, generally stated, in a machine in which a rotating shaft extends into a housing through a gland, the shaft being rotated in only one direction, the housing containing lubricant, the gland including an opening of substantial length, defined by a cylindrical surface with an annular radially inwardly extending flange at an axially inner end, an anti-leakage device is provided that comprises a sleeve mounted around the shaft closely but to permit rotation of the shaft relative to the sleeve. The sleeve is mounted in the gland against rotation. The sleeve has inner and outer cylindrical surfaces. A radial surface on the axially inner end of the sleeve engages an axially outer radial surface of the gland flange. An annular seat in the outer cylindrical surface of the sleeve is spaced axially outwardly of the radial gland flange surface. An O-ring is mounted in the seat, the O-ring bearing on the outer cylindrical surface of the sleeve and an inner cylindrical surface of the gland. In the preferred embodiment, the sleeve is non-metallic, and in particular, is made of a plastic such as acetal.

A helical groove is formed on a radially inner cylindrical surface of the sleeve. The helical groove has a hand such as to tend to pump fluid, either gas or liquid, in a direction toward the interior of the housing, but the groove ends short of the axially inner end of the sleeve.

The terms "axially inner or inward" and "axially outer or outward" are used to indicate a direction toward the housing and away from the housing. Thus, the axially inner end of shaft 8 is the end in which the drive gear 10 is formed and the axially outer end is the end that extends through the motor 6. The terms "radially inner or inward" and "radially outer or outward" are used to indicate a direction toward the axis of rotation of the shaft or away from that axis.

2

In the preferred embodiment, the seat in the sleeve is L-shaped in longitudinal section, with a reduced cylindrical part extending to the gland flange and a radially outwardly extending shoulder spaced axially outwardly from the gland flange.

In the preferred embodiment shown, the sleeve has radially outwardly extending tabs at its axially outer end, which are mounted in complementarily positioned and dimensioned notches in the gland, to anchor the sleeve against rotation with respect to the gland.

Again, in the preferred embodiment collection cavities are formed in a radially extending axially outer surface of the sleeve. At its axially inner end, the sleeve has a continuous radially outer band that engages the radially inwardly extending gland flange, and a continuous radially inner band embracing the shaft, and annularly spaced pockets between the inner and outer bands.

The coefficient of thermal expansion of the plastic of the sleeve is generally greater than that of the shaft. When the shaft is at rest, and is at ambient temperature, the inside diameter of the sleeve around the shaft is preferably no more than one thousandths of an inch greater than the outside diameter of the shaft. This amount of clearance is sufficiently small to prevent leakage of lubricant of the type described in application Ser. No. 08/303,365. When the shaft is turning, and the lubricant in the gear box heats, the diametric clearance may increase to three thousandths, for example, but the interaction of the shaft and helical groove, building up pressure against the surface remaining between the end of the helix and the end of the sleeve, is such as to preclude leakage.

IN THE DRAWINGS

In the drawing, FIG. 1 is a fragmentary sectional view, showing a gear box equipped with one embodiment of anti-leakage device of this invention;

DESCRIPTION OF THE PREFERRED EMBODIMENT

Figure 1:
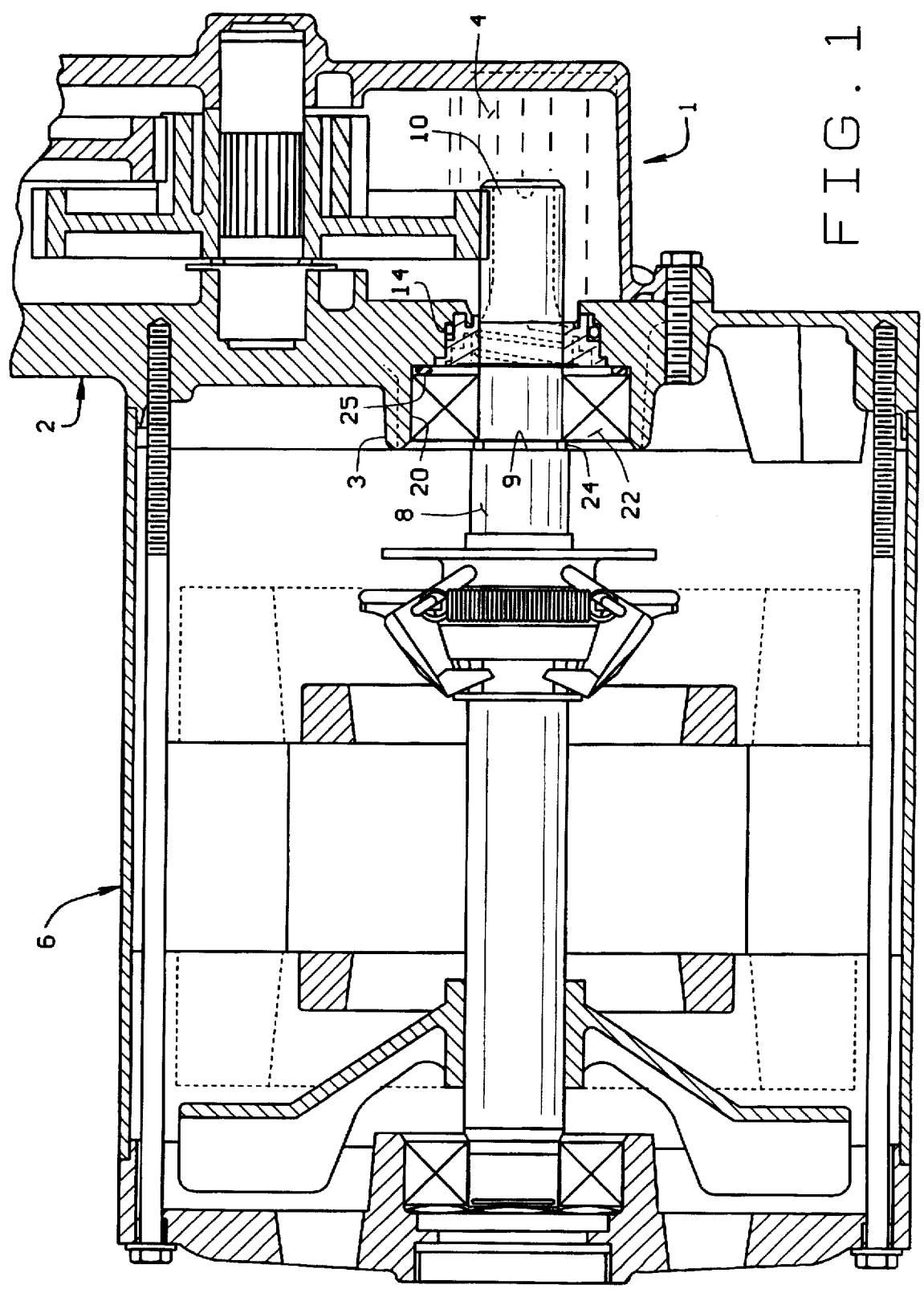
Figure 2:
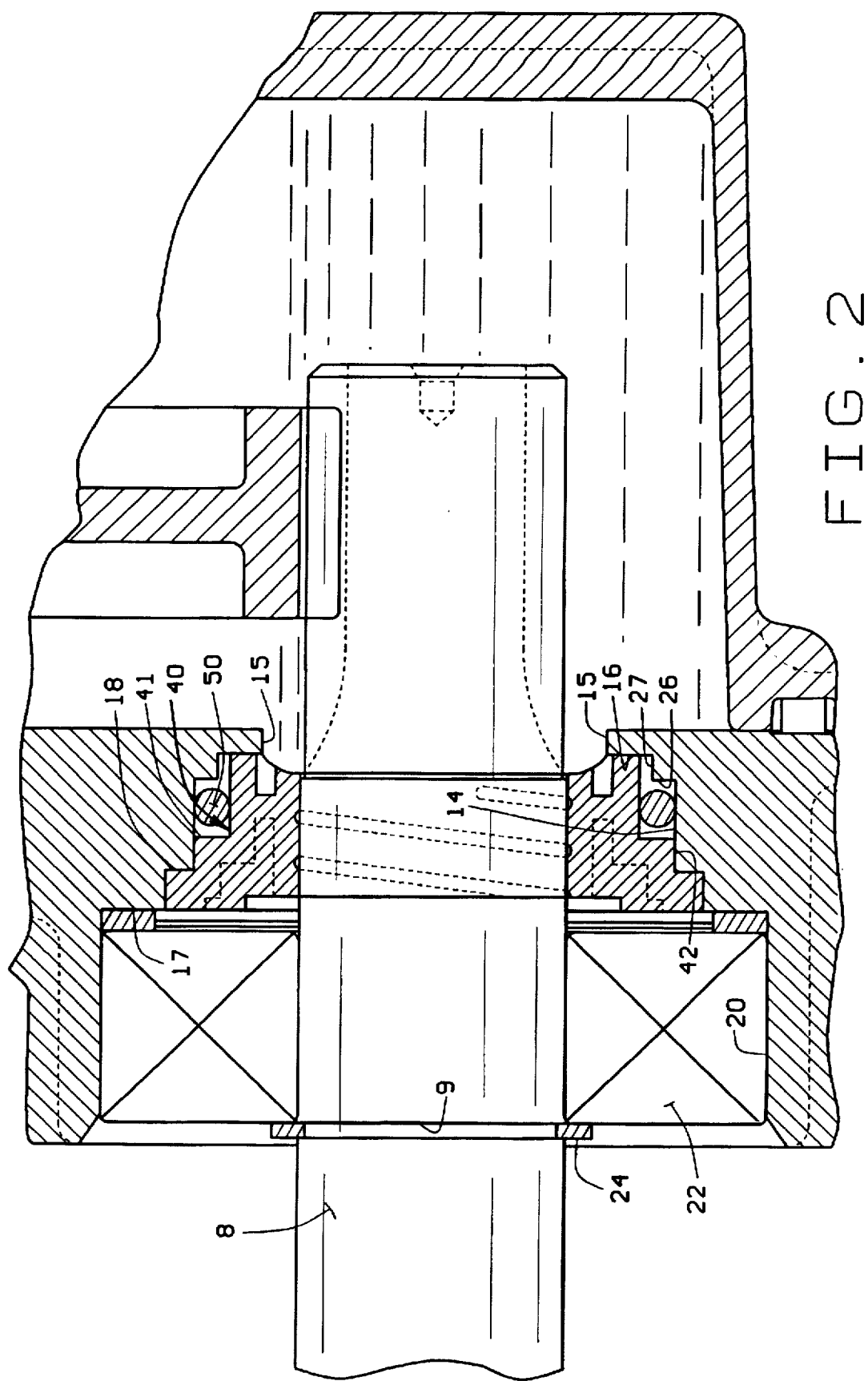
FIG. 2 is an enlarged fragmentary sectional view of the gear box of FIG. 1, without a motor.

Referring now to the drawings for one illustrative embodiment of anti-leakage device of this invention, reference numeral 1 indicates a gear box with a housing 2 in one wall of which a gland 3 is formed. The gear box 1 can be of the type described in co-pending application Ser. No. 08/303,365, but the details of the gearing are not essential to the invention of this application. The housing 2 contains fluid 4. A motor 6 is bolted to the housing. The motor 6 has a shaft 8 which in the embodiment shown, rotates counter clockwise as viewed in a direction from the housing toward the motor. The shaft 8 projects through the gland 3 and into the gear box, where a drive gear 10 is formed in the shaft itself.

The gland 3 has an annular bearing seat 20 on an outer side of the housing, in which a bearing 22 is seated. The bearing 22 is held against axially outward movement by a retaining ring 24 seated in a channel 9 in the shaft 8. The bearing 22 is held against inward displacement by a spacer ring 25 that bears against an outer race of the bearing 22 and against a radial axially outer face of the gland. The gland has a cylindrical seal seat surface 14, at an axially inner end of which a radially inwardly extending flange 15 is formed. Flange 15 has a radial axially outer surface 16. Between the surface 14 and the radial surface 16, is a step, providing a radial surface 26 and an axial surface 27.

Notches 18 are formed in the outer radial face 17 of the bearing seat 20, opening into the opening defined by the cylindrical wall 14.

The anti-leakage device of this embodiment takes the form of a sleeve 30 with a radially inner cylindrical surface 32 defining a passage entirely through the sleeve, and a radially outer cylindrical surface 34. The surface 34 has at its axially outer end a radially outwardly extending step 35, which, on its axially inner edge provides a radially extending surface 41 that with the outer cylindrical surface 34 between it and the axially inner end of the sleeve, forms an O-ring seat 40, in which an O-ring 50 is seated.

At the axially outer "tread" part of the stepped cylindrical surface 34, indicated by reference numeral 42, the sleeve engages the inner cylindrical surface 14 of the gland.

An axially outer radial face of the sleeve 30 is divided into an outer continuous band 37 and an inner continuous band or lip 38, off-set axially inwardly from the band 37, the bands 38 and 37 being connected at their axially outer side by radial ribs 43, between which the sleeve is cored to form collection cavities 44.

Figure 4:
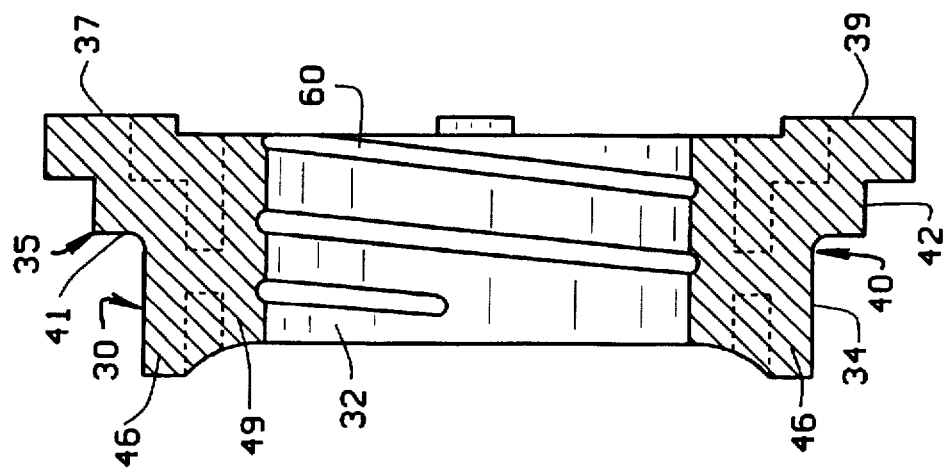
FIG. 4 is a sectional view taken along the line 4—4 of FIG. 3.
Figure 3:
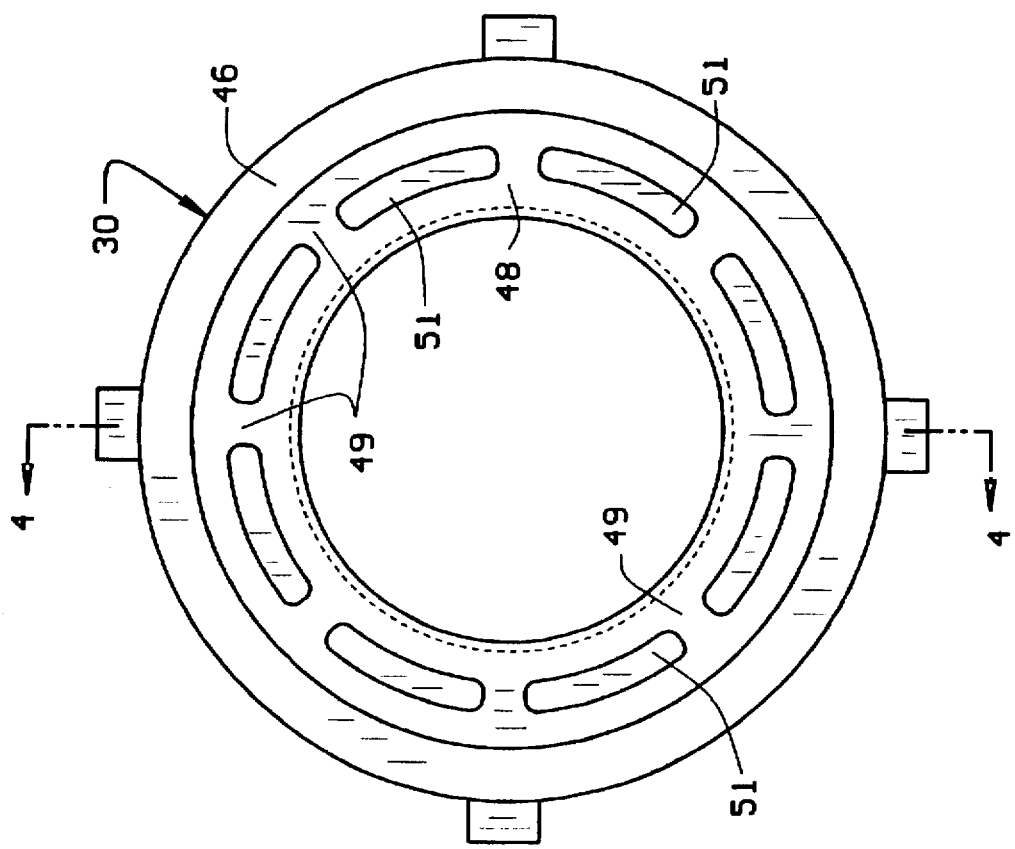
FIG. 3 is an enlarged view in elevation viewed from right to left of FIG. 1 of anti-leakage device shown in FIGS. 1 and 2.
Figure 6:
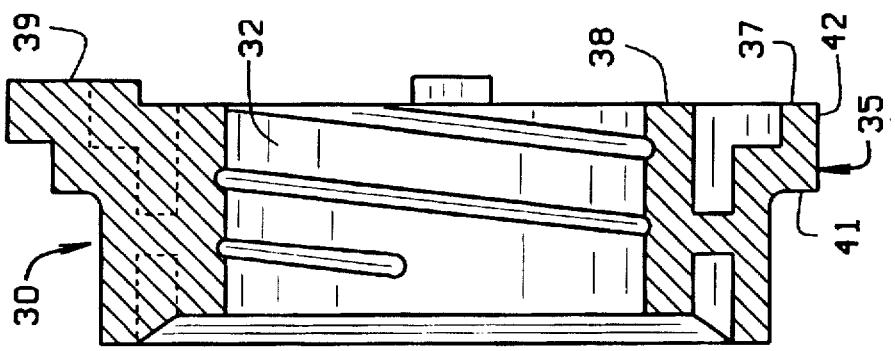
FIG. 6 is a sectional view taken along the line 6—6 of FIG. 5.
Figure 5:
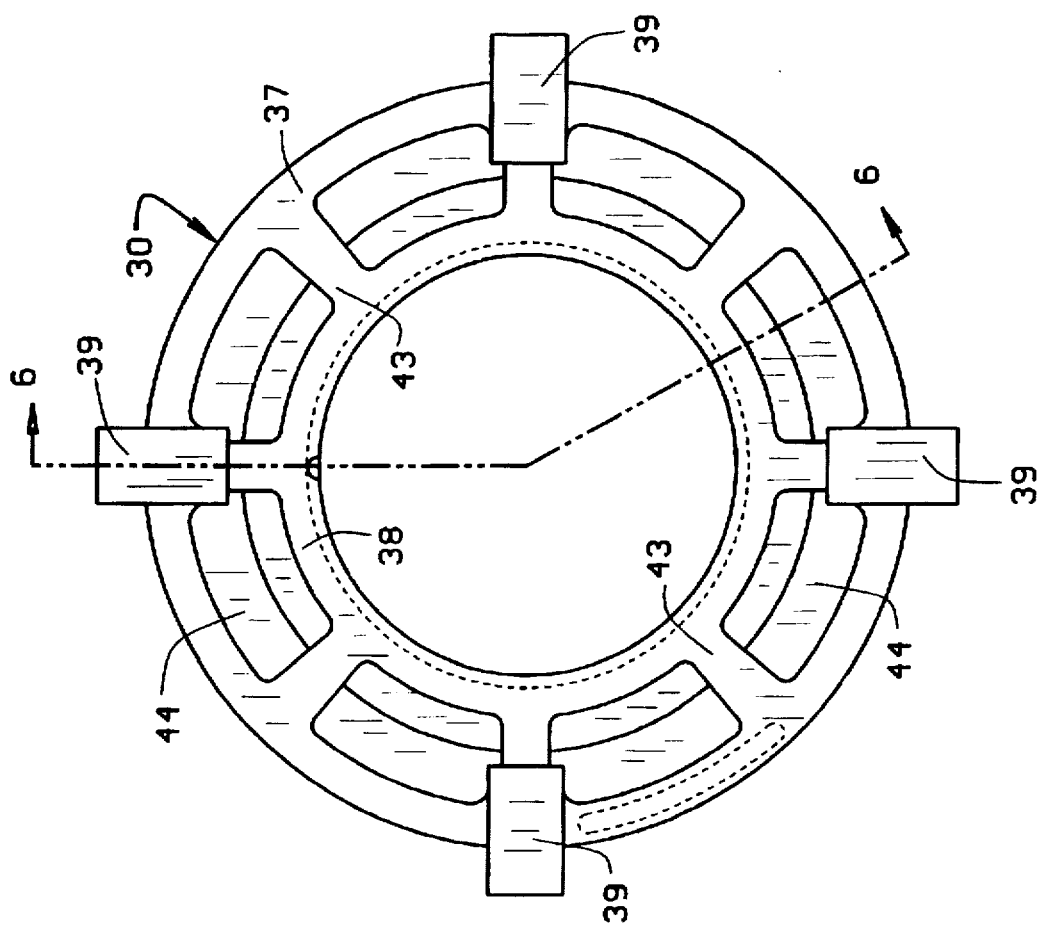
FIG. 5 is a view in elevation from the opposite direction of the device of FIG. 3.

Tabs 39 are in this embodiment, integral with four of the ribs 43, at quadrants, project radially outwardly beyond the outer band 37, and are off-set axially outwardly from the band 37, as shown particularly in FIGS. 4, 5 and 6.

At the axially innermost end of the sleeve, a radial surface 46 constitutes a continuous radially outer band. An inner band or lip 48, also continuous, is off-set both axially outwardly and radially inwardly from the band 46 and the inner band 48 and the outer band 46 are connected by spokes or ribs 49, the sleeve being cored axially to form pockets 51, both to reduce the amount of material in the sleeve and to aid in holding tolerances.

The inside cylindrical surface 32 is interrupted by a helical groove 60, which extends at one end through the axially outer end of the surface 38, but stops short of the axially inner end of the surface 48, as shown particularly in FIGS. 4 and 6. The groove 60 is formed in a direction to move fluid, air and liquid, toward the housing. In the illustrative embodiment, the helical groove is right-handed. If the rotation of the shaft is reversed, the hand of the groove must be reversed, in this case made left handed, so as to move the fluid toward the housing.

Merely by way of illustration, depending upon the lubricant, the diametral clearance between the shaft and the sleeve, with a 0.625 inch diameter shaft, can be on the order of 0.0006 to 0.003 inches. If the lubricant is thixotropic, the clearance may be at the larger end of the range. For a Newtonian fluid or semi-fluid oil, surface tension will determine the gap. With KLUBER PARALIQ 3400 oil as the lubricant, a diametral clearance of 0.001 inches, i.e. 0.0005 inches per side, has been found satisfactory.

The sleeve can be made of acetal plastic. The helical groove can be 0.010 inches deep, on a 0.016 inch radius, ending at its axially inner end 0.030 inches from the edge of the inner band or lip 48. This distance is enough to provide a barrier to lubricant's making its way to and through the groove when the shaft is not rotating. The tabs 39 can be on the order of 0.110 inches wide and project radially outwardly beyond the outer band 37 a distance of 0.070 inches. The tabs are off-set axially outwardly approximately 0.03 inches; the notches 18 are sized complementarily. It will be appreciated that ideally, the clearance between shaft and sleeve would be only enough to permit the shaft to turn freely. The illustrative dimensions given are selected to be practical for a plastic mold process, and therefore are not necessarily optimum for the anti-leak dynamics. They represent an acceptable compromise. The plastic sleeve is designed to be a drop-in replacement for a conventional lip seal, and the outside dimensions and configuration are determined accordingly. The gland in the conventional housing can thus use either the lip seal or the anti-leak device of this invention interchangeably.

Numerous variations in the construction of the anti-leakage device of this invention will occur to those skilled in the art in the light of the foregoing disclosure. Merely by way of illustration, the device can be made of powered metal or even cast metal. One of the disadvantages of using those materials is their increased cost, because the helical groove either requires a complicated core or needs to be machined. An advantage of the use of a metal sleeve is that the coefficient of thermal expansion of the sleeve can be made substantially the same as that of the shaft, so that the clearance between the shaft and the sleeve can be very close and will remain constant. The sleeve could also be made into a bearing surface. Other means for restraining rotation of the sleeve can be employed, such as ribs extending into channels formed on the inside cylindrical surface of the gland, or even a tight press fit. In the embodiment illustrated, the O-ring 50 is caged between the surface 41 of the sleeve and the surface 26 of the gland, and between the cylindrical surface 14 of the gland and the seat portion of the cylindrical surface 34 of the sleeve. Alternatively, an O-ring seat in the sleeve can take the form of a U-shaped channel, in which case the step providing the face 26 can be eliminated. This requires additional material in the sleeve, and requires a more complicated plastic mold; the die having to pull in three directions as compared with the current two. The internal groove can also be integral with a cylindrical surface of the gland in the housing, eliminating the separate sleeve, but complicating the housing die. In most applications, where the lubricant is liquid with a relatively low viscosity, it is essential that the helical groove end short of the axially inner end of the surface in which it is formed. If a thixotropic lubricant is used that assumes a sufficiently high viscosity immediately as it ceases to be agitated, the groove can continue through the axially inner end of the surface. These are merely illustrative of variations.

We claim:

1. An anti-leakage apparatus combining a seal around a shaft for inhibiting lubricant from leaking in an outward direction along the shaft, the apparatus comprising:

a sleeve having axially opposite interior and exterior ends and a bore extending through the sleeve, the bore has an interior surface that extends through the sleeve in an inward direction, opposite the outward direction, from an exterior end of the bore interior surface to an interior end of the bore interior surface;

a shaft mounted in the sleeve bore for rotation therein;

a sole helical groove having an interior end and an exterior end is formed in the bore interior surface, the groove having a configuration that is adapted to convey lubricant toward the groove interior end in response to the shaft rotating in the bore;

the groove being formed in the cylindrical interior surface of the bore extending in the inward direction at least partially through the bore from the exterior end of the groove to the interior end of the groove, the interior end of the groove being spaced from the interior end of the bore interior surface;

the exterior end of the groove intersects the exterior end of the bore interior surface; and except for the presence of the groove, the bore interior surface is a cylinder.

2. The apparatus of claim 1, wherein:

the sleeve is constructed of a plastic material.

3. The apparatus of claim 1, wherein:

the sleeve has an outer end surface intersected by the exterior end of the bore interior surface and an axially opposite inner end surface intersected by the interior end of the bore interior surface, and the sleeve has an outer surface extending around the sleeve between the outer end surface and the inner end surface.

4. The apparatus of claim 1, wherein:

the helical groove has a configuration in the bore interior surface that pumps fluid through the groove in response to rotation of the shaft in the bore.

5. The apparatus of claim 4, wherein:

a collection cavity is positioned adjacent the exterior end of the bore interior surface where it will collect lubricant leaking outwardly through the bore when the shaft is stationary in the bore, and the groove exterior end communicates with the collection cavity where the pumping of fluid through the groove in response to rotation of the shaft in the bore will draw lubricant collected in the collection cavity into the groove.

6. The apparatus of claim 1, wherein:

the groove extends in the inward direction through the bore from the exterior end of the groove to an interior end of the groove, and the interior end of the groove is positioned in the bore cylindrical surface spaced in the outward direction from the interior end of the bore cylindrical surface.

7. The apparatus of claim 1, wherein:

the helical groove is configured in the bore interior surface for moving lubricant leaking outwardly through the bore toward the groove interior end in response to rotation of the shaft in the bore.

8. The apparatus of claim 1, wherein:

the helical groove is configured in the bore interior surface to pump fluid toward the groove interior end in response to the rotation of the shaft in the bore.

9. An anti-leakage apparatus combining a seal around a shaft that passes through a housing wall for inhibiting a supply of lubricant in the housing from leaking in an outward direction along the rotating shaft from an interior end of the shaft exposed to the lubricant in the housing to an exterior end of the shaft positioned in an exterior environment of the housing not exposed to the lubricant, the apparatus comprising:

a sleeve having axially opposite interior and exterior ends and a bore having an interior surface extending through the sleeve;

a shaft mounted in the sleeve bore for rotation therein;

the bore interior surface extends in an inward direction, opposite the outward direction, through the sleeve from an exterior end of the bore interior surface to an interior end of the bore interior surface; and a sole helical groove having an interior end and an exterior end formed in the bore interior surface, the groove being formed in the bore interior surface extending in the inward direction through the bore from the exterior end of the groove to the interior end of the groove, the groove exterior end intersecting the exterior end of the bore interior surface, the groove interior end is positioned in the bore interior surface spaced in the outward direction from the interior end of the bore interior surface, and except for the groove, the bore interior surface is cylinder.

10. The apparatus of claim 9, wherein:

the helical groove has a configuration in the bore interior surface that pump lubricant through the groove in response to rotation of the shaft in the bore.

11. The apparatus of claim 10, wherein:

a collection cavity is positioned adjacent the exterior end of the bore interior surface where it will collect lubricant leaking outwardly through the bore when the shaft is stationary in the bore, and the groove exterior end communicates with the collection cavity where the pumping lubricant through the groove in response to rotation of the shaft in the bore will draw lubricant collected in the collection cavity into the groove.

12. The apparatus of claim 9, wherein:

the helical groove is configured in the bore interior surface to pump lubricant toward the groove interior end in response to the rotation of the shaft in the bore.

13. An anti-leakage apparatus combining a seal around a shaft that passes through a housing wall for inhibiting a supply of lubricant in the housing from leaking in an outward direction along the rotating shaft from an interior end of the shaft exposed to the lubricant in the housing to an exterior end of the shaft positioned in an exterior environment of the housing not exposed to the lubricant, the apparatus comprising:

a sleeve having axially opposite interior and exterior ends and a bore having a cylinder interior surface extending through the sleeve;

a shaft mounted in the sleeve bore for rotation therein;

the bore cylinder surface extends in an inward direction, opposite the outward direction, through the sleeve from an exterior end of the bore cylinder surface at the sleeve exterior end to an interior end of the bore cylinder surface at the sleeve interior end;

a sole helical groove having an interior end and an exterior end is formed in the surface of the bore, the groove being formed in the bore cylinder surface extending in the inward direction at least partially through the bore from the exterior end of the groove to the interior end of the groove, the groove exterior end intersecting the exterior end of the bore cylinder surface; and the helical groove in the bore cylinder surface is adapted to move lubricant leaking outwardly through the bore along the shaft toward the groove interior end in response to rotation of the shaft in the bore.

14. The apparatus of claim 13, wherein:

the sleeve has an outer end surface intersected by the exterior end of the bore interior surface and an axially opposite inner end surface intersected by the interior end of the bore interior surface, and the sleeve has an outer surface extending around the sleeve between the outer end surface and the inner end surface.

15. The apparatus of claim 13, wherein:

the helical groove has a configuration in the bore interior surface that pump lubricant through the groove in response to rotation of the shaft in the bore.

16. The apparatus of claim 15, wherein:

a collection cavity is positioned adjacent the exterior end of the bore interior surface where it will collect lubricant leaking outwardly through the bore when the shaft is stationary in the bore, and the groove exterior end communicates with the collection cavity where the pumping of lubricant through the groove in response to rotation of the shaft in the bore will draw lubricant collected in the collection cavity into the groove.

17. The apparatus of claim 13, wherein:

the groove extends in the inward direction through the bore from the exterior end of the groove to an interior end of the groove, and the interior end of the groove is positioned in the bore cylindrical surface spaced in the outward direction from the interior end of the bore cylindrical surface.

18. An anti-leakage apparatus combining a seal around a shaft that passes through a housing wall for inhibiting a supply of lubricant in the housing from leaking in an outward direction along the rotating shaft from an interior end of the shaft exposed to the lubricant in the housing to an exterior end of the shaft positioned in an exterior environment of the housing not exposed to the lubricant, the apparatus comprising:

a sleeve having axially opposite interior and exterior ends and a bore having a cylinder interior surface extending through the sleeve;

a shaft mounted in the sleeve bore for rotation therein;

the bore cylinder surface extends in an inward direction, opposite the outward direction, through the sleeve from an exterior end of the bore cylinder surface at the sleeve exterior end to an interior end of the bore cylinder surface at the sleeve interior end;

a sole helical groove having an interior end and an exterior end is formed in the surface of the bore, the groove being formed in the bore cylinder surface extending in the inward direction at least partially through the bore from the exterior end of the groove to the interior end of the groove, the groove exterior end intersecting the exterior end of the bore cylinder surface;

the helical groove in the bore cylinder surface is adapted to pump lubricant toward the groove interior end in response to the rotation of the shaft in the bore.

19. The apparatus of claim 18, wherein:

the sleeve has an outer end surface intersected by the exterior end of the bore interior surface and an axially opposite inner end surface intersected by the interior end of the bore interior surface, and the sleeve has an outer surface shaped as a lip seal extending around the sleeve between the outer end surface and the inner end surface.

20. The apparatus of claim 18, wherein:

the groove extends in the inward direction through the bore from the exterior end of the groove to an interior end of the groove, and the interior end of the groove is positioned in the bore cylindrical surface spaced in the outward direction from the interior end of the bore cylindrical surface.

* * * * *